(12) United States Patent
Hiwatashi et al.

(10) Patent No.: US 10,525,962 B2
(45) Date of Patent: Jan. 7, 2020

(54) VEHICLE CONTROL DEVICE

(71) Applicant: MAZDA MOTOR CORPORATION, Hiroshima (JP)

(72) Inventors: Keiichi Hiwatashi, Hiroshima (JP); Daisuke Umetsu, Hiroshima (JP); Osamu Sunahara, Hiroshima (JP); Yasunori Takahara, Hiroshima (JP); Chikako Ohisa, Hiroshima (JP); Daisaku Ogawa, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 16/084,761

(22) PCT Filed: Jul. 13, 2016

(86) PCT No.: PCT/JP2016/070708
§ 371 (c)(1),
(2) Date: Sep. 13, 2018

(87) PCT Pub. No.: WO2018/011916
PCT Pub. Date: Jan. 18, 2018

(65) Prior Publication Data
US 2019/0077391 A1    Mar. 14, 2019

(51) Int. Cl.
*B60W 10/06* (2006.01)
*B60W 10/11* (2012.01)
(Continued)

(52) U.S. Cl.
CPC ............ *B60W 10/11* (2013.01); *B60W 10/04* (2013.01); *B60W 10/18* (2013.01); *B60W 30/02* (2013.01);
(Continued)

(58) Field of Classification Search
CPC ...... B60W 10/06; B60W 10/11; B60W 30/02; B60W 30/045; B60W 30/18145; B60W 2510/20; B60W 2510/205
See application file for complete search history.

(56) References Cited

U.S. PATENT DOCUMENTS

2010/0179719 A1*  7/2010  Kimura ............... B60K 26/021
                                                      701/29.1
2015/0134168 A1*  5/2015  Kawakami ............ B60K 6/485
                                                         701/22
(Continued)

FOREIGN PATENT DOCUMENTS

EP        2979949 A1    2/2016
JP    H10-236186 A     9/1998
(Continued)

OTHER PUBLICATIONS

International Search Report issued in PCT/JP2016/070708; dated Sep. 27, 2016.
(Continued)

*Primary Examiner* — Edwin A Young
(74) *Attorney, Agent, or Firm* — Studebaker & Brackett PC

(57) ABSTRACT

A vehicle control device comprises: a downshift control part (51) configured, upon issuance of a downshift request for downshifting an automatic transmission (200), to execute a downshift control of downshifting the automatic transmission (200) and driving an engine torque regulating mechanism to increase an output torque of an engine (10); a vehicle attitude control part (53) configured, upon satisfaction of a condition that the vehicle is traveling and a steering angle-related value pertaining to a steering angle of a steering device increases, to execute a vehicle attitude control of reducing the output torque of the engine (10) to generate deceleration of the vehicle so as to control vehicle attitude;

(Continued)

and a downshift suppression part (55) configured, when the vehicle attitude control is executed, to suppress the execution of the downshift control.

10 Claims, 9 Drawing Sheets

(51) Int. Cl.
  *B60W 10/04*   (2006.01)
  *B60W 10/18*   (2012.01)
  *B60W 30/02*   (2012.01)
  *B60W 40/10*   (2012.01)
  *B60W 30/045*   (2012.01)
  *B60W 30/18*   (2012.01)

(52) U.S. Cl.
  CPC .... *B60W 30/045* (2013.01); *B60W 30/18145* (2013.01); *B60W 40/10* (2013.01); *B60W 2510/205* (2013.01); *B60W 2540/10* (2013.01); *B60W 2540/16* (2013.01); *B60W 2720/40* (2013.01)

(56) References Cited

U.S. PATENT DOCUMENTS

2016/0059852 A1  3/2016 Yamakado et al.
2016/0129903 A1\* 5/2016 Takahashi ............. B60W 10/06
                      701/22

FOREIGN PATENT DOCUMENTS

JP  2014-166014 A  9/2014
JP  2014-193691 A  10/2014

OTHER PUBLICATIONS

Written Opinion issued in PCT/JP2016/070708; dated Sep. 27, 2016.
Extended European Search Report issued by the European Patent Office dated Apr. 23, 2019, which corresponds to EP16908819.2-1012 and is related to U.S. Appl. No. 16/084,761.

\* cited by examiner

VEHICLE CONTROL DEVICE

TECHNICAL FIELD

The present invention relates to a vehicle control device, and more particularly to a vehicle control device for performing engine control to realize a desired vehicle attitude (vehicle behavior).

BACKGROUND ART

Heretofore, there has been known a control device capable of, in a situation where the behavior of a vehicle becomes unstable due to road wheel slip or the like, controlling the vehicle behavior to enable a safe traveling (e.g., an antiskid brake device). Specifically, there has been known a control device configured to detect that understeer or oversteer behavior occurs in a vehicle during vehicle cornering or the like, and apply an appropriate degree of deceleration to one or more road wheels so as to suppress such behavior.

There has also been known a vehicle motion control device configured to adjust a deceleration of a vehicle during vehicle cornering to thereby adjust a load to be applied to front road wheels as steerable road wheels so as to enable a series of driver's manipulations (braking, turning of a steering wheel, accelerating, turning-back of the steering wheel, etc.) during vehicle cornering under a normal traveling condition to be realized naturally and stably, differently from the aforementioned control for improving safety in a traveling condition causing the vehicle behavior to become unstable.

Further, there has been proposed a vehicle behavior control device configured to reduce a vehicle driving force (vehicle driving torque) according to yaw rate-related quantity corresponding to a steering wheel manipulation by a driver (e.g., yaw acceleration), thereby making it possible to quickly generate vehicle deceleration in response to the start of the steering wheel manipulation by the driver and thus quickly apply a sufficient load to front road wheels as steerable road wheels (see, for example, the following Patent Document 1). In this vehicle behavior control device, in response to the start of the steering wheel manipulation, a load is quickly applied to the front road wheels to cause an increase in frictional force between each of the front road wheels and a road surface and thus an increase in cornering force of the front road wheels, thereby providing an improved turn-in ability of the vehicle in an initial phase after entering a curve, and an improved responsivity with respect to a turning manipulation of a steering wheel (i.e., vehicle's steering stability). This makes it possible to realize a vehicle behavior as intended by the driver.

CITATION LIST

Patent Document

Patent Document 1: JP 2014-166014A

SUMMARY OF INVENTION

Meanwhile, in a vehicle equipped with an automatic transmission, a request for downshifting the automatic transmission (e.g., third speed stage→second speed stage, or second speed stage→first speed stage) is issued depending on a driving state. When performing the downshift, in order to enable a gear ratio of the automatic transmission to be increased, while maintaining an output rotational speed (road wheel-side rotational speed) of the automatic transmission approximately constant, an output torque of an engine is increased so as to increase an input rotational speed (engine-side rotational speed) of the automatic transmission.

However, if a request for such a torque increase during downshift of an automatic transmission and a request for a torque reduction in vehicle attitude control according to a steering wheel manipulation by a driver as described in the Parent Document 1 temporally overlap each other, the following problem will occur. If it is attempted to increase torque for downshift during the course of reducing torque to control vehicle attitude, it becomes impossible to perform a torque reduction enough to control vehicle attitude, resulting in failing to realize a desired vehicle attitude, i.e., failing to adequately improve vehicle's steering stability. On the other hand, if it is attempted to reduce torque to control vehicle attitude during the course of increasing torque for downshift, it becomes impossible to perform torque increase enough for the downshift, resulting in undesirably extended period necessary for the downshift operation of an automatic transmission.

The present invention has been made in view of solving the above conventional problem, and an object thereof is to provide a vehicle control device capable of adequately suppressing the occurrence of a problem caused by concurrently executing both the vehicle attitude control and the automatic transmission downshift control.

Solution to Technical Problem

In order to achieve the above object, according to a first object of the present invention, there is provided a vehicle control device, including: an engine; an engine torque regulating mechanism configured to regulate an output torque of the engine; an automatic transmission provided on a driving force transmitting path between the engine and road wheels; a downshift control part configured to execute a downshift control in which the automatic transmission is downshifted and the engine torque regulating mechanism is driven to increase the output torque of the engine, when a downshift request for downshifting the automatic transmission is issued; and a vehicle attitude control part configured to execute a vehicle attitude control in which the engine torque regulating mechanism is driven to reduce the output torque of the engine to thereby generate deceleration of the vehicle, when such a condition that the vehicle is traveling and that a steering angle-related value pertaining to a steering angle of a steering device increases is satisfied, wherein the vehicle control device further comprises a downshift suppression part configured to suppress executing the downshift control by the downshift control part when the vehicle attitude control is executed by the vehicle attitude control part.

The vehicle control device according to the first aspect of the present invention is configured to suppress the downshift control during the course of the vehicle attitude control, so that it is possible to adequately ensure a torque reduction for controlling vehicle attitude, as compared to a case where the downshift control during the course of the vehicle attitude control is not suppressed. Therefore, the vehicle control device according to the first aspect of the present invention can adequately suppress a situation where, due to intervention of the downshift control during the course of the vehicle attitude control, it becomes impossible to perform a torque reduction enough to control vehicle attitude, resulting in failing to improve steering stability of the vehicle. That is, the vehicle control device according to the first aspect of the present invention can adequately ensure an improvement in steering stability (responsivity with respect to turning manipulation of a steering wheel by a driver) by the vehicle attitude control.

Preferably, in the vehicle control device according to the first aspect of the present invention, the downshift suppression part is configured to prohibit executing the downshift control, when the vehicle attitude control is executed by the vehicle attitude control part.

According to this feature, it becomes possible to reliably suppress an execution period of the downshift control from overlapping an execution period of the vehicle attitude control. This makes it possible to reliably improve the steering stability by the vehicle attitude control.

Preferably, in the vehicle control device according to the first aspect of the present invention, when the vehicle attitude control is executed by the vehicle attitude control part, the downshift suppression part is configured to permit the downshift of the automatic transmission by the downshift control part, while to suppress the drive of the engine torque regulating mechanism by the downshift control part for the purpose of increasing the output torque.

According to this feature, as compared to a case where the downshift control is normally performed during the course of the vehicle attitude control, i.e., a case where an torque increase suitable for downshift is performed without taking into account the fact that the vehicle attitude control is being executed, it becomes possible to adequately ensure a torque reduction for controlling vehicle attitude to reliably ensure the improvement in the steering stability by the vehicle attitude control.

Preferably, in the vehicle control device according to the first aspect of the present invention, the downshift request is issued upon satisfaction of a given gear shifting condition for executing the downshift control, and the downshift suppression part is configured to tighten the gear shifting condition when the vehicle attitude control is executed by the vehicle attitude control part, as compared to when the vehicle attitude control is not executed by the vehicle attitude control part.

According to this feature, the downshift control becomes less likely to be executed during the course of the vehicle attitude control, so that it becomes possible to ensure the improvement in the stability by the vehicle attitude control.

Preferably, the vehicle control device according to the first aspect of the present invention, the downshift suppression part is configured to suppress executing the downshift control by the downshift control part, when the engine torque regulating mechanism is driven by the vehicle attitude control part so as to reduce the output torque of the engine.

According to this feature, it becomes possible to reliably reduce torque by the vehicle attitude control.

According to a second aspect of the present invention, there is provided a vehicle control device, including: an engine; an engine torque regulating mechanism configured to regulate an output torque of the engine; an automatic transmission provided on a driving force transmitting path between the engine and road wheels; a downshift control part configured to execute a downshift control in which the automatic transmission is downshifted and the engine torque regulating mechanism is driven to increase the output torque of the engine, when a downshift request for downshifting the automatic transmission is issued; and a vehicle attitude control part configured to execute a vehicle attitude control in which the engine torque regulating mechanism is driven to reduce the output torque of the engine to thereby generate deceleration of the vehicle, when such a condition that the vehicle is traveling and that a steering angle-related value pertaining to a steering angle of a steering device increases is satisfied, wherein the vehicle control device further comprises a vehicle attitude control suppression part configured to suppress executing the vehicle attitude control by the vehicle attitude control part when the downshift control is executed by the downshift control part.

The vehicle control device according to the second aspect of the present invention is configured to suppress the vehicle attitude control during the course of the downshift control, so that it becomes possible to adequately ensure an torque increase for downshift, as compared to a case where the vehicle attitude control during the course of the downshift control is not suppressed. Therefore, the vehicle control device according to the second aspect of the present invention can adequately suppress a situation where, due to intervention of the vehicle attitude control during the course of the downshift control, it becomes impossible to perform a torque increase enough for downshift, resulting in undesirably extended period necessary for the downshift operation.

According to a third aspect of the present invention, there is provided a vehicle control device, comprising: an engine; an engine torque regulating mechanism configured to regulate an output torque of the engine; an automatic transmission provided on a driving force transmitting path between the engine and road wheels; a downshift control part configured to execute a downshift control in which the automatic transmission is downshifted and the engine torque regulating mechanism is driven to increase the output torque of the engine, when a downshift request for downshifting the automatic transmission is issued; and a vehicle attitude control part configured to execute a vehicle attitude control in which the engine torque regulating mechanism is driven to reduce the output torque of the engine to thereby generate deceleration of the vehicle, when such a condition that the vehicle is traveling and that a steering angle-related value pertaining to a steering angle of a steering device increases is satisfied, wherein the vehicle control device further comprises a period overlapping suppression part configured to suppress an overlap between an execution period during which the downshift control is executed by the downshift control part and an execution period during which the vehicle attitude control is executed by the vehicle attitude control part.

The vehicle control device according to the third aspect of the present invention is configured to suppress the execution period of the downshift control from overlapping the execution period of the vehicle attitude control, so that it becomes possible to reliably suppress a situation where, due to intervention of the downshift control during the course of the vehicle attitude control, it becomes impossible to perform a torque reduction enough to control vehicle attitude, resulting in failing to improve steering stability of the vehicle. That is, the vehicle control device according to the third aspect of the present invention can reliably ensure an improvement in the steering stability by the vehicle attitude control. Further, the vehicle control device according to the third aspect of the present invention can suppress the execution period of the vehicle attitude control from overlapping the execution period of the downshift control, so that it becomes possible to reliably suppress a situation where, due to intervention of the vehicle attitude control during the course of the downshift control, it becomes impossible to perform a torque increase enough for downshift, resulting in undesirably extended period necessary for the downshift operation.

Preferably, in the vehicle control device according to any one of the first to third aspect of the present invention, the vehicle further comprises a steering angle sensor configured to detect the steering angle of the steering device, and the vehicle attitude control part is configured to execute the vehicle attitude control, when such a condition that the vehicle is traveling and that a change rate of the steering angle detected by the steering angle sensor is equal to or greater than a given value is satisfied.

Effect of Invention

The vehicle control device of the present invention can adequately suppress the occurrence of a problem caused by concurrently executing both the vehicle attitude control and the automatic transmission downshift control.

DESCRIPTION OF EMBODIMENTS

With reference to the accompanying drawings, a vehicle control device according to embodiments in the present invention will now be described.
<System Configuration>

Figure 1:
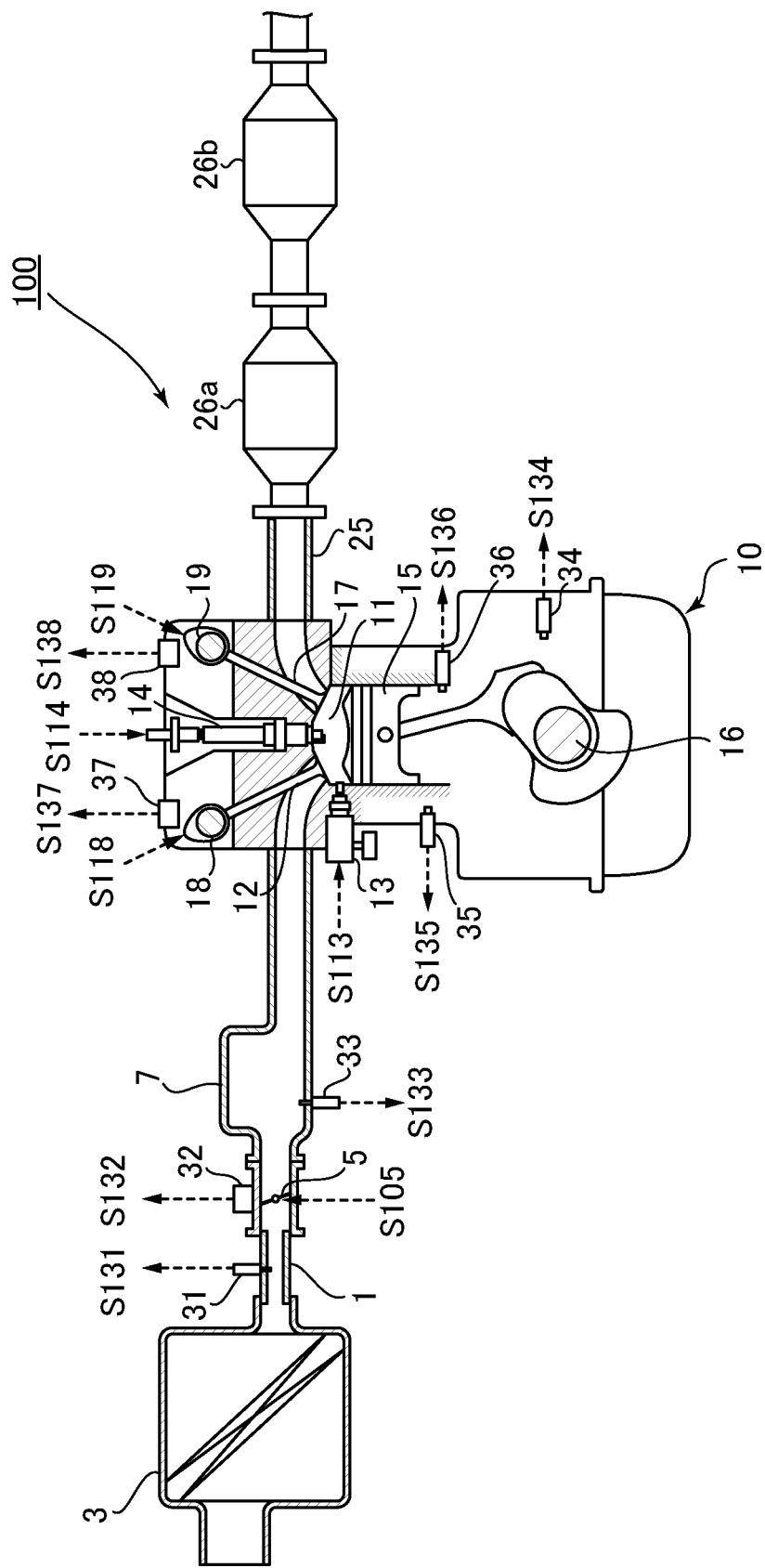
FIG. 1 is a schematic configuration diagram of an engine system associated with a vehicle control device according to the present embodiment.

First of all, an engine system associated with a vehicle control device according to a present embodiment in the present invention will be described with reference to FIGS. 1 and 2. FIG. 1 is a schematic configuration diagram of an engine system associated with the vehicle control device according to the present embodiment, and FIG. 2 is a block diagram depicting an electrical configuration of the vehicle control device according to the present embodiment.

Figure 2:
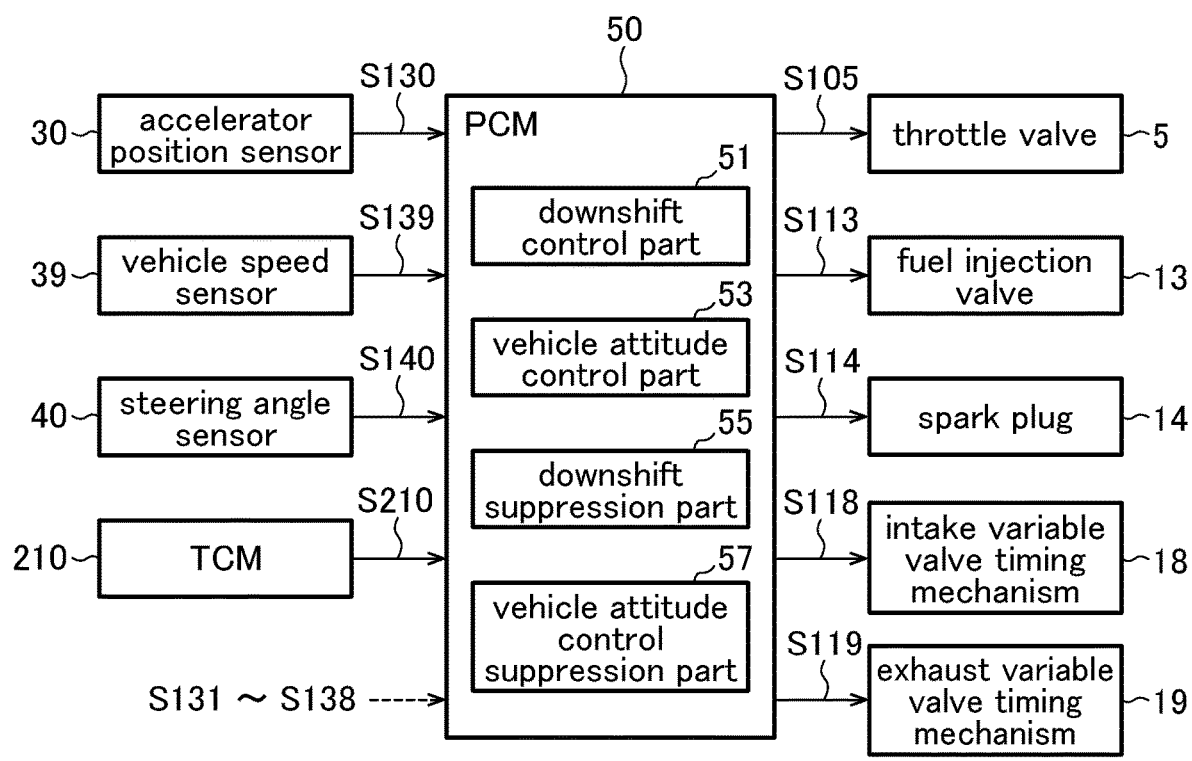
FIG. 2 is a block diagram depicting an electrical configuration of the vehicle control device according to the present embodiment.

As depicted in FIGS. 1 and 2, the engine system 100 primarily comprises: an intake passage 1 for allowing intake air (air) introduced from outside to pass therethrough; an engine 10 (specifically, gasoline engine) configured to combust therein a mixture of intake air supplied from the intake passage 1 and fuel supplied from an aftermentioned fuel injection valve 13, to generate a vehicle driving force; and an exhaust passage 25 for discharging exhaust gas produced by the combustion in the engine 10; a plurality of sensors 30 to 40 for detecting various states of the engine system 100; and a PCM (Power-train Control Module) 50 for controlling an entirety of the engine system 100.

The intake passage 1 is provided with an air cleaner 3 for cleaning intake air introduced from the outside, a throttle valve 5 for adjusting an amount of intake air passing therethrough (intake air amount), and a surge tank 7 for temporarily storing intake air to be supplied to the engine 10, which are arranged in this order from the side of an upstream end of the intake passage 1.

The engine 10 is primarily provided with: an intake valve 12 for selectively introducing intake air from the intake passage 1 into a combustion chamber 11; a fuel injection valve 13 for injecting fuel toward the combustion chamber 11; a spark plug 14 for igniting a mixture of the intake air and the fuel supplied into the combustion chamber 11; a piston 15 configured to be reciprocatingly moved according to combustion of the air-fuel mixture in the combustion chamber 11; a crankshaft 16 configured to be rotated according to the reciprocating movement of the piston 15; and an exhaust valve 17 for selectively discharging, to the exhaust passage 25, exhaust gas produced by the combustion of the air-fuel mixture in the combustion chamber 11.

The engine 10 is configured such that operation timings (which are equivalent to valve phases) of the intake valve 12 and the exhaust valve 17 are variably controlled, respectively, by an intake variable valve timing mechanism 18 and an exhaust variable valve timing mechanism 19 which serve as a variable valve timing mechanism. As each of the intake variable valve timing mechanism 18 and the exhaust variable valve timing mechanism 19, it is possible to use any of various heretofore-known types. For example, an electromagnetically or hydraulically-constructed mechanism may be used to variably control the operation timing of each of the intake valve 12 and the exhaust valve 17.

The exhaust passage 25 is primarily provided with a plurality of exhaust gas purifying catalysts 26a, 26b having exhaust gas purifying functions, such as a NOx catalyst, a three-way catalyst, and an oxidation catalyst. In the following description, when the exhaust gas purifying catalysts 26a, 26b are generically used without being functionally distinguished from each other, they will be described as "exhaust gas purifying catalyst 26."

The engine system 100 comprises the plurality of sensors 30 to 40 for detecting various states of the engine system 100, as mentioned above. Specifically, these sensors 30 to 40 are as follows. The sensor 30 is an accelerator position sensor for detecting an accelerator position, i.e., an angular position of an accelerator pedal (which is equivalent to the amount of depression of the accelerator pedal manipulated by a driver). The sensor 31 is an airflow sensor for detecting an intake air amount which is equivalent to a flow rate of intake air passing through the intake passage 1. The sensor 32 is a throttle opening sensor for detecting a throttle opening which is an opening degree of the throttle valve 5. The sensor 33 is a pressure sensor for detecting an intake manifold pressure (internal pressure of an intake manifold) which is equivalent to the pressure of intake air supplied to the engine 10. The sensor 34 is a crank angle sensor for detecting a crank angle of the crankshaft 16. The sensor 35 is a water temperature sensor for detecting a water temperature which is the temperature of cooling water for cooling the engine 10. The sensor 36 is a temperature sensor for detecting an in-cylinder temperature which is an internal temperature of each cylinder of the engine 10. The sensors 37 and 38 are, respectively, an intake-side cam angle sensor for detecting operation timings of the intake valve 12 including a valve-close timing, and an exhaust-side cam angle sensor for detecting operation timings of the exhaust valve 17 including a valve-close timing. The sensor 39 is a vehicle speed sensor for detecting the speed of a vehicle (vehicle speed). The sensor 40 is a steering angle sensor for detecting a rotational angle (steering angle) of a steering wheel of a non-depicted steering device of the vehicle. The above sensors 30 to 40 are operable to output, to the PCM 50, detection signals S130 to S140 corresponding to detected parameters, respectively.

Based on the detection signals S130 to S140 input from the sensors 30 to 40, the PCM 50 is operable to perform controls for various components within the engine system 100. Specifically, the PCM 50 is operable to: supply a control signal S105 to the throttle valve 5 to control opening and closing timings and the throttle opening of the throttle valve 5; supply a control signal S113 to the fuel injection valve 13 to control a fuel injection amount and a fuel injection timing; supply a control signal S114 to the spark plug 14 to control an ignition timing; and supply control signals S118, S119, respectively, to the intake variable valve timing mechanism 18 and the exhaust variable valve timing mechanism 19 to control the operation timings of the intake valve 12 and the exhaust valve 17. Each of the throttle valve 5, the fuel injection valve 13, the spark plug 14, the intake variable valve timing mechanism 18 and the exhaust variable valve timing mechanism 19 is equivalent to one example of "engine torque regulating mechanism" set forth the appended claims.

Further, the PCM 50 is configured to accept an input of a given signal S210 from a TCM (Transmission Control Module) 210 for controlling an automatic transmission mounted to the vehicle. Here, with reference to FIG. 3, an automatic transmission associated with the vehicle control device according to the present embodiment will be described, and, with reference to FIG. 4, a gear shift map for deciding a speed stage of the automatic transmission, for use in the vehicle control device according to the present embodiment will be described.

Figure 3:
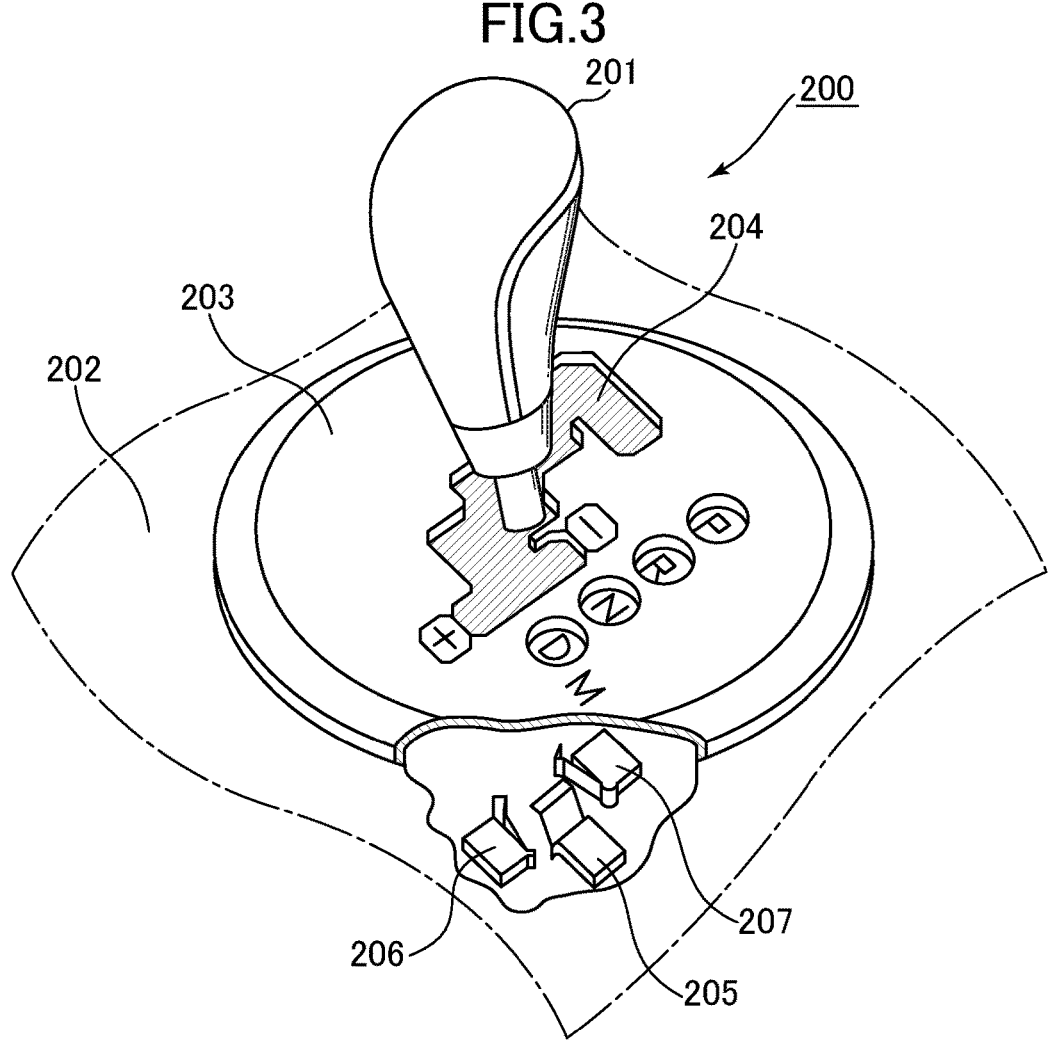
FIG. 3 is a perspective view of a shift lever and a shift gate of an automatic transmission associated with the vehicle control device according to the present embodiment.

FIG. 3 is a perspective view of a shift lever and a shift gate of the automatic transmission 200 associated with the vehicle control device according to the present embodiment. As depicted in FIG. 3, a shift lever 201 is a lever for selecting one of a plurality of operation ranges of the automatic transmission 200, and provided to protrude upwardly from a cover 203 attached to a center console 202 between a driver seat and a front passenger seat of the vehicle. The cover 203 is formed with a zigzag-shaped shift gate 204, and the shift lever 201 is inserted through the shift gate 204. The shift lever 201 can be swingingly moved along the shift gate 204 to select any one of the operation ranges, specifically, a P range, an R range, an N range, a D range, and an M range. The D range (Drive range) is a range for selecting an automatic shifting mode in which speed stages of the automatic transmission 200 are automatically switched therebetween based on a given shift characteristic. The M range (Manual range) is a range in which a driver is allowed to manually switch between speed stages of the automatic transmission 200. Each of the P range and the N range corresponds to a non-traveling range.

Figure 4:
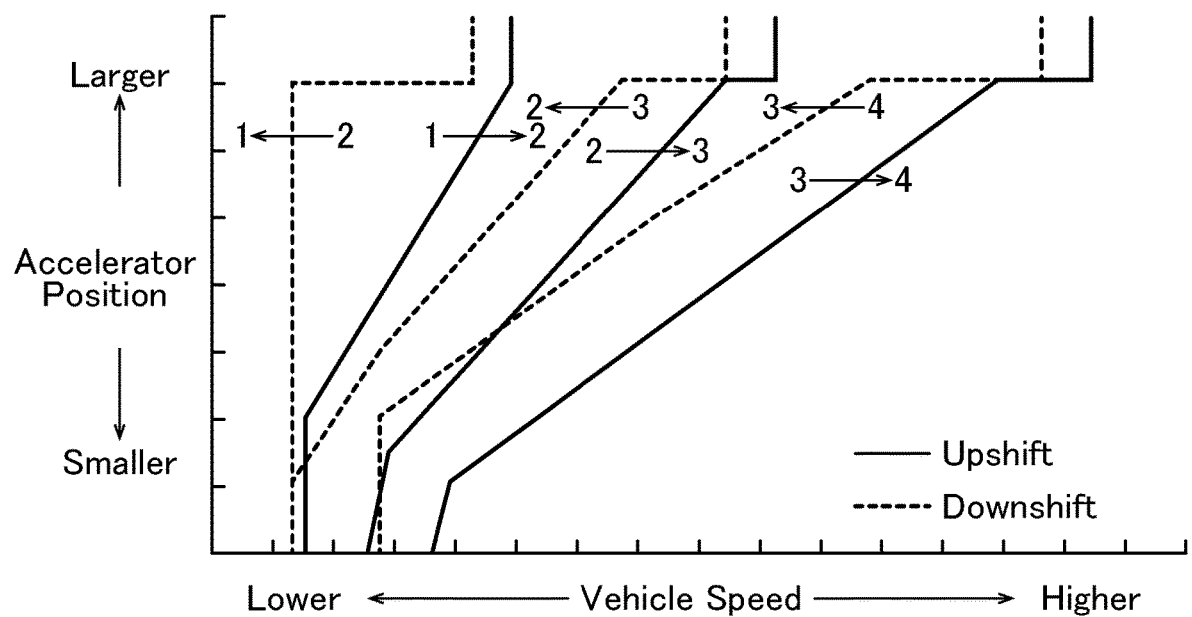
FIG. 4 is a gear shift map for deciding a speed stage of the automatic transmission, for use in the vehicle control device according to the present embodiment.

FIG. 4 is a gear shift map for deciding a speed stage of the automatic transmission, for use in the vehicle control device according to the present embodiment. As presented in FIG. 4, the gear shift map is defined by the vehicle speed (horizontal axis) and the accelerator position (vertical axis). When the operation range is set to the D range, the TCM 210 is operable, based on such a gear shift map, to perform a shift operation of the automatic transmission 200 according to the vehicle speed and the accelerator position. Specifically, TCM 210 is operable, based on a gear shift map indicated by the solid lines in FIG. 4, to upshift the automatic transmission 200 (e.g., first speed stage→second speed stage, or second speed stage→third speed stage) according to a change (changes) in the vehicle speed and/or the accelerator position, or, based on a gear shift map indicated by the broken lines in FIG. 4, to downshift the automatic transmission 200 (e.g., second speed stage→first speed stage, or third speed stage→second speed stage) according to a change (changes) in the vehicle speed and/or the accelerator position.

The TCM 210 is operable, when it determines, according to the vehicle speed and/or the accelerator position, that there arises a situation where the automatic transmission 200 should be downshifted, to output, to the PCM 50, a signal 210 corresponding to a request for downshifting the automatic transmission 200 (downshift request). Specifically, in order to enable a gear ratio of the automatic transmission 200 to be increased when downshifting the automatic transmission 200, the TCM 210 is operable to output, to the PCM 50, a request for increase a torque of the engine 10 so as to increase an input rotational speed (rotational speed on the side of the engine 10) of the automatic transmission 200. In addition to the request for increasing the engine torque, the TCM 210 is also operable to output, to the PCM 50, an amount of the engine torque to be increased during the downshift (this amount will hereinafter be referred to appropriately as "downshifting torque-up request amount."

Returning to FIG. 2, the PCM 50 comprises the following functional elements. As a first element, the PCM 50 comprises a downshift control part 51 operable, upon issuance of the above downshift request, to execute downshift control of downshifting the automatic transmission 200, and increasing the torque of the engine 10. Exactly, this downshift control is realized by cooperative control between the PCM 50 and the TCM 210 (the TCM executes control for performing a downshift operation, and the PCM executes control for increasing the engine torque). As a second element, the PCM comprises a vehicle attitude control part 53 operable, upon satisfaction of a condition that the vehicle is traveling, and a steering angle-related value pertaining to a steering angle of a steering wheel of the vehicle (typically, steering speed) is increasing, to execute vehicle attitude control of reducing the torque of the engine 10 to thereby generate deceleration of the vehicle to control vehicle attitude. As third and fourth elements, the PCT 50 comprises: a downshift suppression part 55 operable, when the vehicle attitude control is executed by the vehicle attitude control part 53, to suppress the execution of the downshift control by the downshift control part 51; and a vehicle attitude control suppression part 57 operable, when the downshift control is executed by the downshift control part 53, to suppress the execution of the vehicle attitude control by the vehicle attitude control part 53. The downshift suppression part 55 and the vehicle attitude control suppression part 57 function to suppress an execution period of the vehicle attitude control and an execution period of the downshift control from overlapping each other, so that they function as "period overlapping suppression part" set forth in the appended claims. In the following description, the vehicle attitude control by the vehicle attitude control part 53 will be appropriately rephrased as "torque reduction control."

The above elements of the PCM 50 are functionally realized by a computer which comprises: a CPU; various programs (including a basic control program such as an OS, and an application program capable of being activated on the OS to realize a specific function) to be interpreted and executed by the CPU; and an internal memory such as ROM or RAM storing therein the programs and a variety of data.

<Control in First Embodiment>

Next, with reference to FIGS. 5 to 7, control to be executed by a vehicle control device according to a first embodiment of the present invention will be described.

Figure 5:
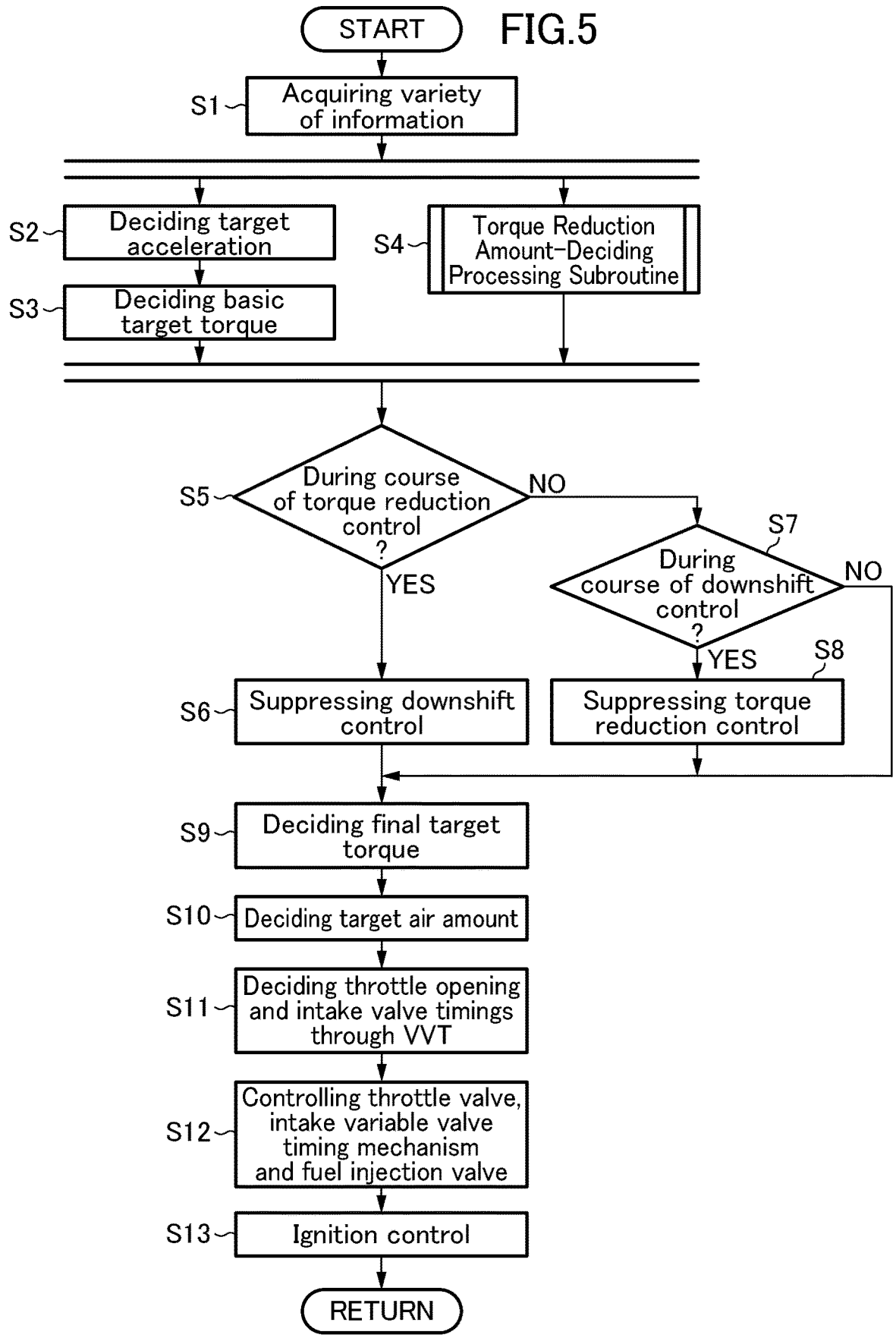
FIG. 5 is a flowchart presenting a control processing routine to be executed by a vehicle control device according to a first embodiment of the present invention.
Figure 6:
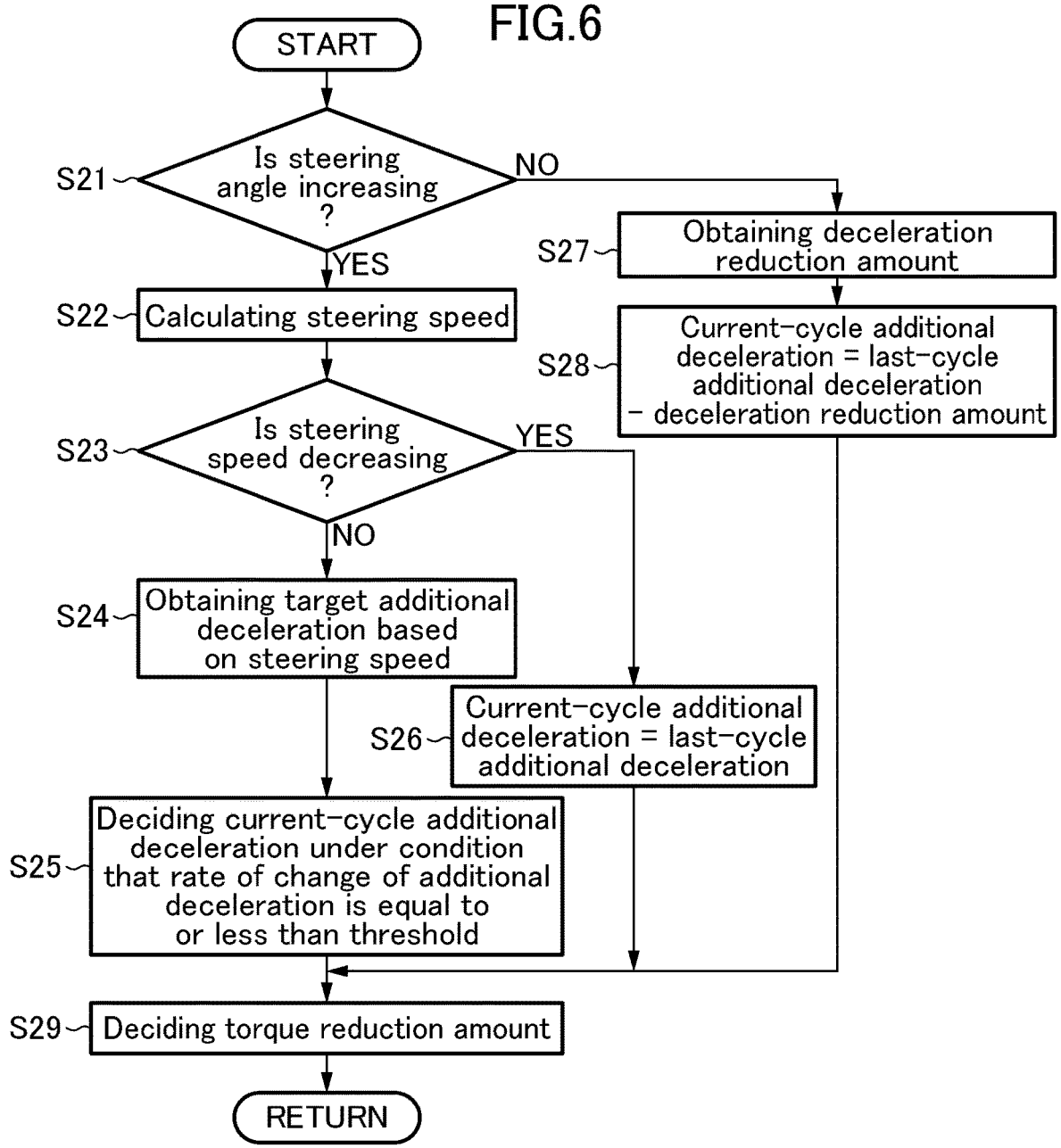
FIG. 6 is a flowchart presenting a torque reduction amount-deciding processing subroutine to be executed by the vehicle control device according to the first embodiment.

FIG. 5 is a flowchart of a vehicle control processing routine to be executed by the vehicle control device according to the first embodiment, and FIG. 6 is a flowchart of a torque reduction amount-deciding processing subroutine to be executed by the vehicle control device according to the first embodiment, so as to decide a torque reduction amount. FIG. 7 is a map expressing a relationship between the steering speed and a target additional deceleration to be decided by the vehicle control device according to the first embodiment.

The vehicle control processing routine in FIG. 5 is activated when an ignition switch of the vehicle is turned on to apply power to the vehicle control device, and repeatedly executed with a given cycle period. Further, this vehicle control processing routine is basically executed during traveling of the vehicle.

As depicted in FIG. 5, upon the start of the vehicle control processing routine, in step S1, the PCM 50 operates to acquire information about a driving state of the vehicle. Specifically, the PCM 50 operates to acquire, as information about the vehicle driving state, detection signals S130 to S140 output from the aforementioned sensors 30 to 40, including the accelerator position detected by the accelerator position sensor 30, the vehicle speed detected by the vehicle speed sensor 39, the steering angle detected by the steering angle sensor 40, and a speed stage currently set in the automatic transmission of the vehicle.

Subsequently, in step S2, the PCM 50 operates to set a target acceleration, based on the vehicle driving state including a manipulation state of the accelerator pedal, acquired in the step S1. Specifically, the PCM 50 operates to select, from among a plurality of acceleration characteristic maps each defining a relationship between acceleration and accelerator position, with respect to various vehicle speeds and various speed stages (the maps are preliminarily created and stored in a memory or the like), one acceleration characteristic map corresponding to a current vehicle speed and a current speed stage, and decide, as a target acceleration, an acceleration corresponding to a current accelerator position, with reference to the selected acceleration characteristic map.

Subsequently, in step S3, the PCM 50 operates to decide a basic target torque of the engine 10 for realizing the target acceleration decided in the step S2. In this processing, the PCM 50 operates to decide the basic target torque within a torque range outputtable by the engine 10, based on current vehicle speed, speed stage, road grade, road surface μ, etc.

In parallel with the processings in the steps S2 and S3, the PCM 50 operates, in step S4, to execute a torque reduction amount-deciding processing subroutine for deciding a torque reduction amount in the torque reduction control (vehicle attitude control), based on the steering angle of the steering wheel detected by the steering angle sensor 40. This torque reduction amount-deciding processing subroutine will be described with reference to FIG. 6.

As depicted in FIG. 6, upon the start of the torque reduction amount-deciding processing subroutine, in step S21, the PCM 50 operates to determine whether or not the absolute value of the steering angle acquired in the step S1 is increasing. As a result, when the absolute value of the steering angle is increasing (step S21: YES), the subroutine proceeds to step S22. In the step S22, the PCM 50 operates to calculate a steering speed based on the steering angle acquired in the step S1.

Subsequently, in step S23, the PCM 50 operates to determine whether or not the absolute value of the steering speed is decreasing. As a result, when the absolute value of the steering speed is not decreasing (step S23: NO), i.e., the absolute value of the steering speed is increasing or the absolute value of the steering speed does not change, the subroutine proceeds to step S24. In the step S24, the PCM 50 operates to obtain a target additional deceleration based on the calculated steering speed. This target additional deceleration is a deceleration to be added to the vehicle according to the manipulation state of the steering wheel in order to accurately realize a vehicle behavior intended by a driver.

Figure 7:
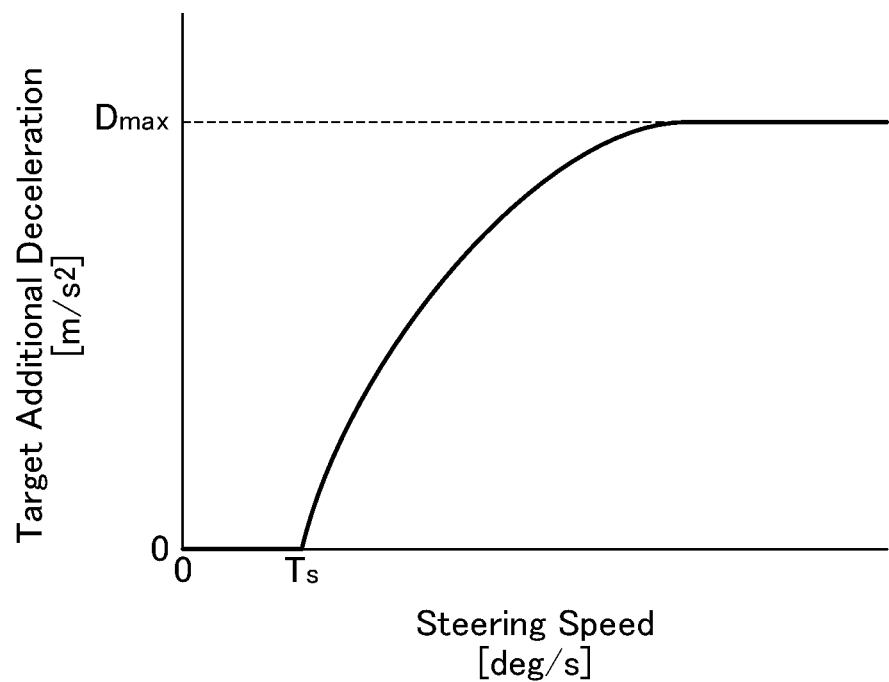
FIG. 7 is a map for deciding a target additional deceleration, for used in the vehicle control device according to the first embodiment.

Specifically, the PCM 50 operates to obtain a value of the target additional deceleration corresponding to the steering speed calculated in the step S22, based on a relationship between the target additional deceleration and the steering speed, expressed by the map in FIG. 7.

In FIG. 7, the horizontal axis represents the steering speed, and the vertical axis represents the target additional deceleration. As depicted in FIG. 7, when the steering speed is less than a threshold $T_S$ (e.g., 10 deg/s), a corresponding value of the target additional deceleration is 0. That is, when the steering speed is less than the threshold $T_S$, the control of adding a deceleration to the vehicle according to the manipulation state of the steering wheel is not performed.

On the other hand, when the steering speed is equal to or greater than the threshold $T_S$, a value of the target additional deceleration corresponding to this steering speed comes closer to a given upper limit (e.g., 1 m/s$^2$) as the steering speed becomes larger. That is, as the steering speed becomes larger, the target additional deceleration becomes larger, and the rate of increase of the target additional deceleration becomes smaller.

Subsequently, in the step S25, the PCM 50 operates to decide an additional deceleration in the current processing cycle (current-cycle additional deceleration), under the condition that the rate of increase of the additional deceleration is equal to or less than a threshold $R_{max}$ (e.g., 0.5 m/s$^3$).

Specifically, the PCM 50 operates to, when the rate of increase from an additional deceleration decided in the last processing cycle (last-cycle additional deceleration) to the target additional deceleration decided in the step S24 in the current processing cycle is equal to or less than the threshold $R_{max}$, decide the target additional deceleration decided in the step S24, as the current-cycle additional deceleration. On the other hand, the PCM 50 operates to, when the rate of increase from the last-cycle additional deceleration to the target additional deceleration decided in the step S24 in the current processing cycle is greater than the threshold $R_{max}$, decide, as the current-cycle additional deceleration, a value obtained by increasing the last-cycle additional deceleration at the increase rate $R_{max}$ for the given cycle period.

Referring to the step S23 again, when the absolute value of the steering speed is decreasing (step S23: YES), the subroutine proceeds to step S26. In the step S26, the PCM 50 operates to decide the last-cycle additional deceleration as the current-cycle additional deceleration. That is, when the absolute value of the steering speed is decreasing, a value of the additional deceleration corresponding to the maximum value of the steering speed (i.e., the maximum value of the additional deceleration) is maintained.

Referring to the step S21 again, when the absolute value of the steering wheel angle is not increasing (Step S21: NO), i.e., the absolute value of the steering wheel angle is maintained constant or is decreasing, the subroutine proceeds to step S27. In the step S27, the PCM 50 operates to obtain an amount (deceleration reduction amount) by which the last-cycle additional deceleration is to be reduced in the current processing cycle. For example, the deceleration reduction amount may be calculated based on a constant reduction rate (e.g., 0.3 m/s$^3$) preliminarily stored in a memory or the like. Alternatively, the deceleration reduction amount may be calculated based on a reduction rate decided according to the vehicle driving state acquired in the step S1 and/or the steering speed calculated in the step S22.

Subsequently, in step S28, the PCM 50 operates to decide the current-cycle additional deceleration by subtracting the deceleration reduction amount obtained in the step S27 from the last-cycle additional deceleration.

After completion of the processing of the step S25, S26 or S28, the PCM 50 operates, in step S29, to decide the torque reduction amount, based on the current-cycle additional deceleration decided in the step S25, S26 or S28. Specifically, the PCM 50 operates to decide a value of the torque reduction amount required for realizing the current-cycle additional deceleration, based on current vehicle speed, speed stage, road grade, etc., acquired in the step S1. After completion of the processing of the step S29, the PCM 50 operates to terminate the torque reduction amount-deciding processing subroutine, and the subroutine returns to the main routine.

In the above step S21, it is determined whether or not the steering angle (absolute value) is increasing. Alternatively, it may be determined whether or not the steering speed (i.e., a change rate of the steering angle) is equal to or greater than a given value. Specifically, in another example, when the steering speed becomes equal to or greater than a first given value, a condition for starting the torque reduction control is determined to be satisfied, and the processings in the steps S23 to S26 and S29 are performed to decide the torque reduction amount. Then, when the steering speed becomes less than a second given value, a condition for terminating the torque reduction control is determined to be satisfied, and the processings in the steps S27 to S29 are performed to decide the torque reduction amount. As the first and second given values, values of the steering speed corresponding to the threshold $T_S$ in FIG. 7 may be used.

Returning to FIG. 5, after completion of the processings in the steps S2 and S3 and the torque reduction amount-deciding processing subroutine in the step S4, the PCM 50 operates, in step S5, to determine whether or not the torque reduction control is being executed. As a result, when the torque reduction control is being executed (step S5: YES), the routine proceeds to step S6. In the step S6, the PCM 50 operates to suppress the execution of the downshift control for downshifting the automatic transmission 200. Specifically, the PCM 50 operates to prohibit the downshift operation of the automatic transmission 200 by the TCM, and prohibit an increase of the torque of the engine 10 along with the downshift. In this way, the PCM 50 operates to suppress the execution period of the downshift control from overlapping the execution period of the torque reduction control. Subsequently, the routine proceeds to step S9. In the step S9, the PCM 50 operates to subtract the torque reduction amount decided through the torque reduction amount-deciding processing subroutine in the step S4 from the basic target torque decided in the step S3 to thereby decide a final target torque.

On the other hand, when the torque reduction control is not being executed (step S5: NO), the routine proceeds to step S7. In the step S7, the PCM 50 operates to determine whether or not the downshift control is being executed. That is, it is determined whether or not the downshift control in which the TCM 210 operates to downshift the automatic transmission 200, and the PCM 50 operates to increase the torque of the engine 10 is currently being executed. As a result, when the downshift control is being executed (step S7: YES), the routine proceeds to step S8. In the step S8, the PCM 50 operates to suppress execution of the torque reduction control, specifically, prohibit execution of the torque reduction control. In this way, the PCM 50 operates to suppress the execution period of the torque reduction control from overlapping the execution period of the downshift control. Subsequently, the routine proceeds to the step S9. In the step S9, the PCM 50 operates to add the amount of the torque of the engine 10 to be increased when downshifting the automatic transmission 200 (downshifting torque-up request amount) to the basic target torque decided in the step S3 to thereby decide the final target torque.

Here, the downshifting torque-up request amount is calculated by the TCM 210. For example, a map defining a relationship between the engine torque just before a downshift operation and the downshifting torque-up request amount is preliminarily prepared, and, when a downshift operation is performed, the TCM 210 operates to decide a value of the downshifting torque-up request amount corresponding to a current value of the engine torque, with reference to the map.

On the other hand, when the downshift control is not being executed (step S7: NO), the routine proceeds to the step S9. In this case, neither the torque reduction control nor the downshift control is being executed. Thus, in the step S9, the PCM 50 operates to use, as the final target torque, the basic target torque decided in the step S3, without any change.

After completion of the processing of the step S9, the routine proceeds to step S10. In step S10, the PCM 50 operates to decide a target air amount and a target fuel amount which are necessary to cause the engine 10 to output the final target torque decided in the step S9. Here, the term "air amount" means the amount of air to be introduced into the combustion chamber 11 of the engine 10. It is to be understood that non-dimensional charging efficiency may be used in place of the air amount.

Specifically, the PCM 50 operates to calculate a target indicated torque while taking into account a loss torque due to friction loss and pumping loss, in addition to the final target torque, and calculate a target fuel amount necessary to generate the target indicated torque, and to decide the target air amount, based on the calculated target fuel amount and a target equivalent ratio.

Subsequently, in step S11, the PCM 50 operates to decide the opening degree of the throttle valve 5, and opening and closing timings of the intake valve 12 through the intake variable valve timing mechanism 18, while taking into account the air amount detected by the airflow sensor 31, so as to enable air to be introduced into the engine 10 in an amount equal to the target air amount decided in the step S10.

Subsequently, in step S12, the PCM 50 operates to control the throttle valve 5 and the intake variable valve timing mechanism 18, based on the throttle opening and the opening and closing timings of the intake valve 12 set in the step S11, and control the fuel injection valve 13, based on the target fuel amount decided in the step S10.

Subsequently, in step S13, the PCM 50 operates to set an ignition timing so as to cause the engine 10 to output the final target torque, based on the final target torque decided in the step S9, and an actual air amount actually introduced into the combustion chamber 11 as a result of controlling the throttle valve 5 and the intake variable valve timing mechanism 18 in the step S11, and control the spark plug 14 so as to perform ignition at the decided ignition timing. After completion of the processing of the step S13, the PCM 50 completes one cycle of the engine control processing routine.

Next, with reference to FIG. 8, functions/effects of the vehicle control device according to the first embodiment will be described. Charts (a)-(g) in FIG. 8 are time charts presenting temporal changes in various parameters related to engine control in a situation where a vehicle equipped with the vehicle control device according to the first embodiment is turning by a steering wheel operation.

Figure 8:
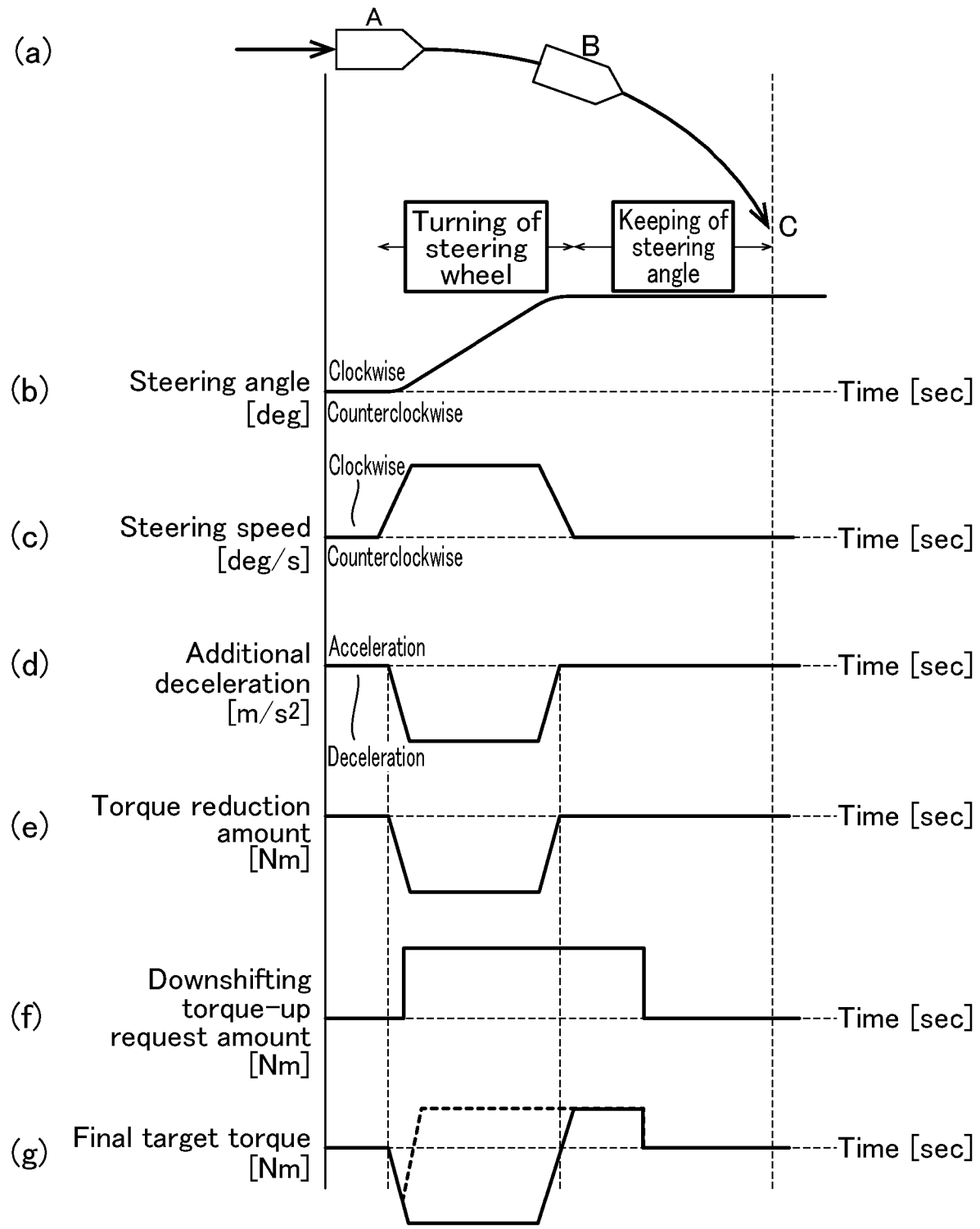
FIG. 8 is a time chart for explaining functions/effects of the vehicle control device according to the first embodiment.

The chart (a) in FIG. 8 is a top plan view schematically depicting the vehicle which is turning in a clockwise direction. As presented in the chart (a), the vehicle starts clockwise turning from a position A, and continues the clockwise turning from a position B to a position C at a constant steering angle.

The chart (b) in FIG. 8 is a chart presenting a change in steering angle of the vehicle which is turning in the clockwise direction as presented in the chart (a). In the chart (b), the horizontal axis represents time, and the vertical axis represents the steering angle.

As presented in the chart (b), clockwise steering is started at the position A, and then, along with operation of additionally turning the steering wheel, a clockwise steering angle gradually increases and reaches a maximum value at the position B. Subsequently, the steering angle is maintained constant until the vehicle reaches the position C (Keeping of the steering angle).

The chart (c) in FIG. 8 is a chart presenting a change in steering speed of the vehicle which is turning in the clockwise direction as presented in the chart (a). In the chart (c), the horizontal axis represents time, and the vertical axis represents the steering speed.

The steering speed of the vehicle is expressed as a temporal differentiation of the steering angle of the vehicle. That is, as presented in the chart (c), when clockwise steering is started at the position A, a clockwise steering speed arises and is maintained approximately constant in an intermediate zone between the position A and the position B. Then, when the clockwise steering speed decreases and the clockwise steering angle reaches the maximum value at the position B, the steering speed becomes 0. Then, when the clockwise steering angle is maintained during traveling from the position B to the position C, the steering speed is kept at 0.

The chart (d) in FIG. 8 is a chart presenting a change in additional deceleration decided based on the steering speed presented in the chart (c). In the chart (d), the horizontal axis represents time, and the vertical axis represents the additional deceleration.

As described with reference to FIG. 6, when the absolute value of the steering angle is determined to be increasing, and the absolute value of the steering speed is determined to be not decreasing (in FIG. 6, the step S21: YES, and the step S23: NO), the PCM 50 operates to obtain the target additional deceleration according to the steering speed (see FIG. 7), and to decide the additional deceleration under the condition that the rate of increase of the additional deceleration is equal to or less than the threshold $R_{max}$ (step S25 in FIG. 6), as presented in the chart (d). That is, the PCM 50 operates to increase the additional deceleration so as to satisfy the following relation: the rate of increase rate thereof≤the threshold $R_{max}$. Then, when the absolute value of the steering angle is determined to be increasing, and the absolute value of the steering speed is determined to be decreasing (in FIG. 6, the step S21: YES, and the step S23: YES), the PCM 50 operates to maintain the additional deceleration corresponding the maximum steering speed. On the other hand, when the absolute value of the steering angle is determined to be decreasing (in FIG. 6, the step S21: NO), the PCM 50 operates to obtain the deceleration reduction amount, and reduce the additional deceleration by the deceleration reduction amount (steps S27, S28 in FIG. 6).

The chart (e) in FIG. 8 presents a change in the torque reduction amount decided based on the additional deceleration presented in the chart (d). In the chart (e), the horizontal axis represents time, and the vertical axis represents the torque reduction amount.

As mentioned above, the PCM 50 operates to decide the torque reduction amount necessary to realize the additional deceleration, based on parameters such as current vehicle speed, speed stage and road grade. Thus, when these parameters are constant, the torque reduction value is decided such that it changes in the same manner as a change in the additional deceleration presented in the chart (d).

The chart (f) in FIG. 8 is a chart presenting a change in the downshifting torque-up request amount. In the chart (f), the horizontal axis represents time, and the vertical axis represents the downshifting torque-up request amount.

The chart (f) is obtained in a case where a downshift request is issued during the course of setting the torque reduction amount while performing a turning manipulation of the steering operation between the position A and the position B, i.e., during the course of executing the torque reduction control, and a value of the downshifting torque-up request amount according to the downshift request is calculated. In this case, particularly when the torque reduction amount is changing in its reduction direction, setting of the downshifting torque-up request amount is started.

The chart (g) in FIG. 8 is a chart presenting a change in the final target torque. In the chart (g), the horizontal axis represents time, and the vertical axis represents the final target torque. In the chart (g), the solid line indicates a final target torque curve to be used in the first embodiment, and the broken line indicates a final target torque curve to be used in a comparative example.

In the comparative example, the final target torque is determined by using both the torque reduction amount in the chart (e) and the downshifting torque-up request amount in the chart (f). Specifically, as indicated by the broken line in the chart (g), a torque obtained by subtracting the torque reduction amount from the basic target torque (decided in the step S3 in FIG. 5) is first decided as the final target torque, and subsequently a torque obtained by adding the downshifting torque-up request amount to the torque obtained by subtracting the torque reduction amount from the basic target torque is determined as the final target torque. In this case, after the addition of the downshifting torque-up request amount, the final target torque will be increased. Therefore, in the comparative example, it is impossible to perform a torque reduction enough to control vehicle attitude, resulting in failing to realize a desired vehicle attitude, i.e., failing to adequately improve vehicle's steering stability.

Compared with this, in the first embodiment, the PCM 50 operates to determine that the setting of the downshifting torque-up request amount in the chart (f) is performed during the course of the torque reduction control (step S5 in FIG. 5: YES), and suppress the execution of the downshift control (step S6 in FIG. 5). That is, the PCM 50 operates to suppress the execution period of the downshift control from overlapping the execution period of the torque reduction control. In this case, the PCM 50 operates to prohibit the downshifting torque-up request amount from being applied (added) to the basic target torque, and decide, as the final target torque, a torque obtained by subtracting the torque reduction amount in the chart (e) from the basic target torque, as indicated by the solid line in the chart (g) (step S9 in FIG. 5). In this way, the final target torque is reduced with respect to the basic target torque by the torque reduction amount, and a deceleration according to the toque reduction arises in the vehicle, thereby causing load shifting to the front road wheels. As a result, a friction force between each of the front road wheels and a road surface is increased, and thus a cornering force of the front road wheels is increased. Thus, it becomes possible to control vehicle attitude with good responsivity with respect to the manipulation of the steering wheel by a driver, to accurately realize a behavior intended by the driver. That is, it becomes possible to adequately improve steering stability of the vehicle.

Further, in the first embodiment, just after the vehicle passes through the position B, the PCM 50 operates to terminate the torque reduction control, and permit the execution of the downshift control. Specifically, as indicated by the solid line in the chart (g), the PCM 50 operates to decide, as the final target torque, a torque obtained by adding the downshifting torque-up request amount in the chart (f) to the basic target torque, as indicated by the solid line in the chart (g). In this way, the final target torque is increased with respect to the basic target torque by the downshifting torque-up request amount, so that it becomes possible to realize a torque increase appropriate to the downshift operation in the automatic transmission 200. As a result, the downshift operation in the automatic transmission 200 will be adequately performed.

As presented in FIG. 8, in the first embodiment, the execution of the downshift control is suppressed during the course of the torque reduction control (vehicle attitude control). This makes it possible to reliably suppress a situation where, due to increasing the engine torque for downshift during the course of reducing the engine torque to control vehicle attitude, as in the comparative example, it becomes unable to perform a torque reduction enough to control vehicle attitude, resulting in failing to improve steering stability of the vehicle. That is, in the first embodiment, it becomes possible to adequately ensure an improvement in vehicle's steering stability by the vehicle attitude control.

FIG. 8 shows an example in which the execution of the downshift control is suppressed during the course of the torque reduction control. Further, in the first embodiment, the execution of the torque reduction control is suppressed during the course of the downshift control. This makes it possible to reliably suppress a situation where, due to reducing the engine torque to control vehicle attitude during the course of increasing the engine torque for downshift, it becomes unable to perform a torque increase enough for the downshift, resulting in undesirably extended period necessary for the downshift operation of the automatic transmission 200.

<Control in Second Embodiment>

Next, control to be executed by a vehicle control device according to a second embodiment of the present invention will be described. The following description will be made about only control different from the control in the first embodiment, and any description about the same control as that in the first embodiment will be omitted (functions/effects will be handled as with control). Thus, any content which will not be described here should be understood that it is the same as that in the first embodiment.

In the first embodiment, the execution of the downshift control is suppressed during the course of the torque reduction control (vehicle attitude control), and the execution of the torque reduction control is suppressed during the course of the downshift control, to thereby suppress the execution period of the torque reduction control and the execution period of the downshift control from overlapping each other. Differently, in the second control, the downshift control is suppressed in a situation where a given lateral acceleration causing the execution of the torque reduction control arises in the vehicle, and consequently (in other words, naturally) the execution period of the downshift control is suppressed from overlapping the execution period of the torque reduction control.

Figure 9:
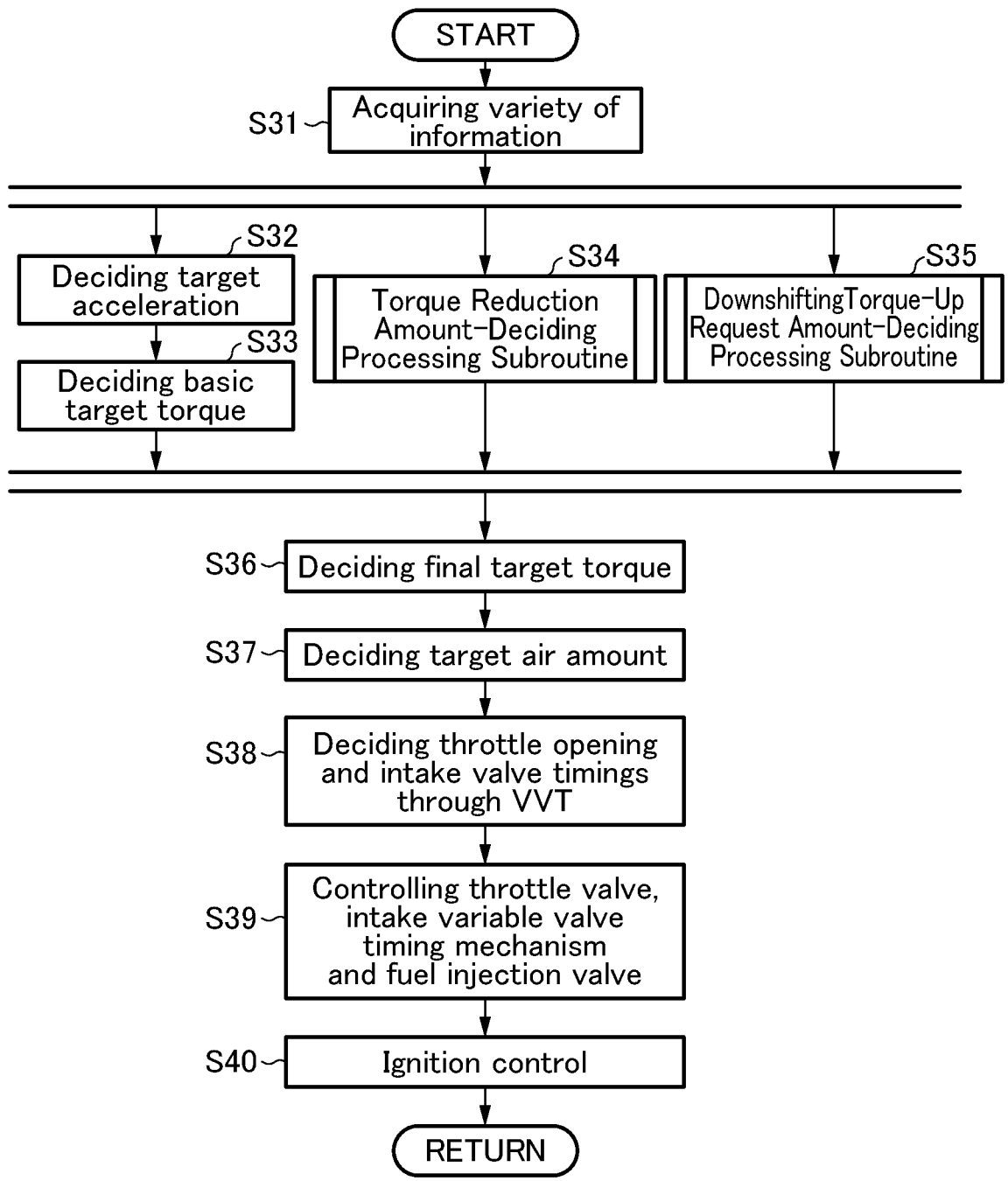
FIG. 9 is a flowchart presenting a control processing routine to be executed by a vehicle control device according to a second embodiment of the present invention.
Figure 10:
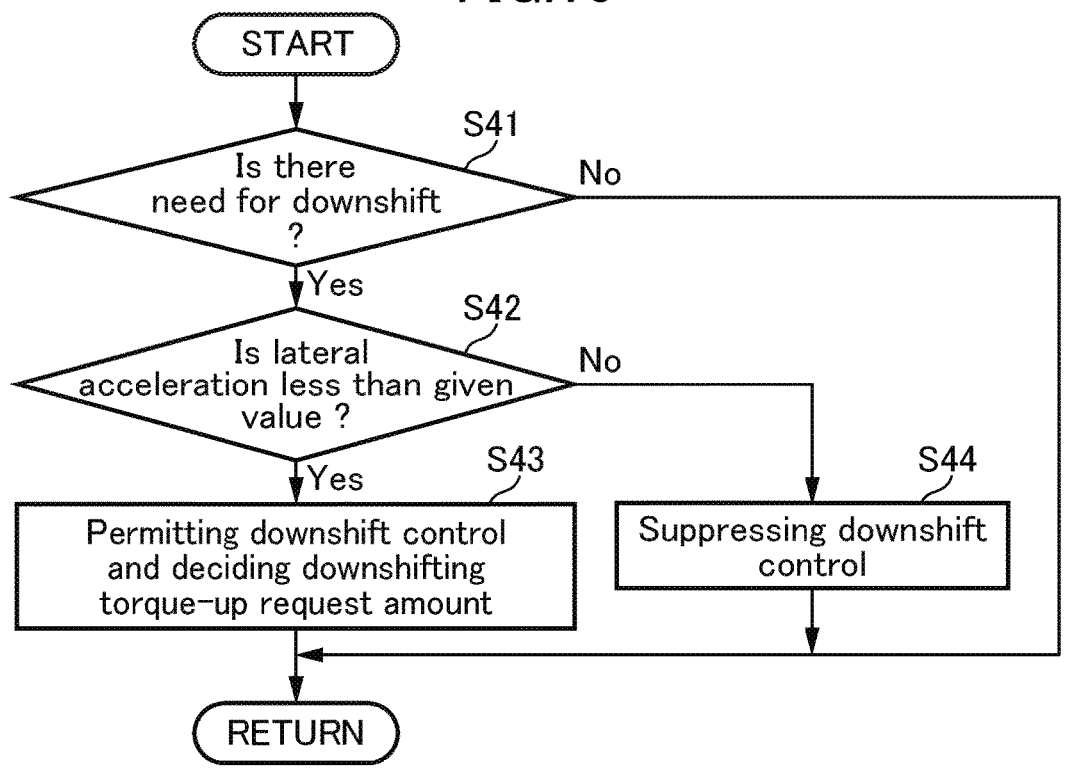
FIG. 10 is a flowchart presenting a downshifting torque-up request amount-deciding processing subroutine to be executed by the vehicle control device according to the second embodiment.

With reference to FIGS. 9 and 10, the control to be executed by the vehicle control device according to the second embodiment will be specifically described. FIG. 9 is a flowchart presenting a control processing routine to be executed by the vehicle control device according to the second embodiment, and FIG. 10 is a flowchart presenting a downshifting torque-up request amount-deciding processing subroutine for deciding the downshifting torque-up request amount, to be executed by the vehicle control device according to the second embodiment.

Steps S31 to S34 and steps S37 to S40 in FIG. 9 are identical, respectively, the steps S1 to S4 and steps S10 to S13 in FIG. 15, and therefore their description will be omitted. The following description will be made mainly about only steps S35 and S36.

In the step S35, the TCM 210 operates to execute the downshifting torque-up request amount-deciding processing subroutine for deciding an amount of the torque of the engine 10 to be increased when downshifting the automatic transmission (downshifting torque-up request amount), in parallel to processings of the steps S32, S33 and S34. This downshifting torque-up request amount-deciding processing subroutine will be described with reference to FIG. 10.

As presented in FIG. 10, upon the start of the downshifting torque-up request amount-deciding processing subroutine, in step S41, the TCM 210 operates to refer to the gear shift map depicted in FIG. 4 to determine, based on a current vehicle speed and a current accelerator position, whether or not the automatic transmission 200 should be downshifted. That is, it is determined whether or not there is a need for downshift. As a result, when there is no need for downshift (step S41: NO), the subroutine is terminated.

In this case, TCM 210 operates not to decide the downshifting torque-up request amount.

On the other hand, when there is the need for downshift (step S41: YES), the subroutine proceeds to step S42. In the step S42, the TCM 210 operates to determine whether or not a lateral acceleration arising in the vehicle is less than a given value. In this processing, it is determined whether or not the vehicle is in a stable state. In this embodiment, in order to execute the shift operation of the automatic transmission 200 in a stable state of the vehicle, the shift operation of the automatic transmission 200 is permitted only when the lateral acceleration is less than the given value, and is prohibited when the lateral acceleration is equal to or greater than the given value. This makes it possible to realize a stable shift operation of the automatic transmission 200.

From this point of view, the given value for determining the lateral acceleration in the step S42 may be set in conformity to a boundary value of a lateral acceleration range allowing a stable shift operation of the automatic transmission 200 to be realized. For example, a value of the lateral acceleration corresponding to the aforementioned threshold $T_S$ (see FIG. 7) for determining the steering speed may be used as the given value. In a preferred example, a value slightly less than a value of the lateral acceleration arising in the vehicle when the steering wheel is manipulated at the steering speed $T_S$ is used as the given value. Further, a lateral angular velocity sensor may be installed to the vehicle to detect the lateral acceleration. Although the determination in the step S41 is made based on the lateral acceleration, it may be made based on the yaw rate or steering speed, instead of the lateral acceleration.

As a result of the determination in the step S42, when the lateral acceleration is less than the given value (step S42: YES), the subroutine proceeds to the step S43. In the step S43, the TCM 210 operates to permit the execution of the downshift control, and decide the downshifting torque-up request amount. For example, a map defining a relationship between the engine torque just before a downshift operation and the downshifting torque-up request amount is preliminarily prepared, and the TCM 210 operates to decide a value of the downshifting torque-up request amount corresponding to a current value of the engine torque, with reference to the map.

On the other hand, when the lateral acceleration is equal to or greater than the given value (step S42: NO), the subroutine proceeds to step S44. In the step S44, the TCM 210 operates to suppress the execution of the downshift control. In this case, the TCM 210 operates not to decide the downshifting torque-up request amount.

Returning to FIG. 9, after completion of the processings in the steps S32 and S35, the PCM 50 operates, in step S36, to decide the final target torque. Specifically, the PCM operates to decide the final target torque in the following manner.

In a situation where the downshifting torque-up request amount is decided through the downshifting torque-up request amount-deciding processing subroutine in the step S35, the lateral acceleration is less than the give value (step S42: YES), and therefore a given steering angle and a given steering speed as conditions for executing the torque reduction control do not arise, so that the torque reduction control is not executed, i.e., the torque reduction amount is not decided through the torque reduction amount-deciding processing subroutine in the step S34. In this case, the PCM 50 operates to decide the final target torque by adding the downshifting torque-up request amount decided through the downshifting torque-up request amount-deciding processing subroutine in the step S35, to the basic target torque decided in the step S33.

On the other hand, in a situation where the torque reduction amount is decided through the torque reduction amount-deciding processing subroutine in the step S34, a given steering angle and a given steering speed as conditions for executing the torque reduction control arise, and therefore the lateral acceleration becomes equal to or greater than the given value (step S42: NO), so that the downshift control is suppressed (step S44), i.e., the downshifting torque-up request amount is not decided in the step S35. In this case, the PCM 50 operates to decide the final target torque by subtracting the torque reduction amount decided through the torque reduction amount-deciding processing subroutine in the step S34, from the basic target torque decided in the step S33.

On the other hand, in a case where the torque reduction amount is not decided through the torque reduction amount-deciding processing subroutine in the step S34, and he downshifting torque-up request amount is not decided through the downshifting torque-up request amount-deciding processing subroutine in the step S35, the PCM 50 operates to use, as the final target torque, the basic target torque decided in the step S33, without any change.

Subsequently, the same processings as those of the steps S10 to S13 in FIG. 5 are performed in the steps S37 to S40, to cause the engine 10 to output the final target torque decided in the step S36.

In the above second embodiment, it becomes possible to adequately suppress overlapping between the execution period of the torque reduction control (vehicle attitude control) and the execution period of the downshift control. Thus, in the second embodiment, it becomes possible to reliably suppress a situation where, due to the downshift control executed during the course of the torque reduction control, it becomes impossible to perform a torque reduction enough to control vehicle attitude, resulting in failing to improve steering stability of the vehicle. That is, in the second embodiment, it becomes possible to adequately ensure an improvement in the steering stability by the vehicle attitude control. Further, in the second embodiment, it becomes possible to reliably suppress a situation where, due to the torque reduction control executed during the course of the downshift control, it becomes impossible to perform a torque increase enough for downshift, resulting in undesirably extended period necessary for the downshift operation.

<Modifications>

The following description will be made about some modifications of the above embodiments.

In the above embodiments, the downshift control is prohibited during the course of the torque reduction control. Specifically, in the above embodiments, during the course of the torque reduction control, the downshift operation of the automatic transmission 200 is prohibited, and the torque increase along with this downshift operation is also prohibited. However, in one modification, instead of completely prohibiting the downshift control as above, during the course of the torque reduction control, the downshift operation of the automatic transmission 200 may be permitted, and the torque increase along with the downshift operation is suppressed. Specifically, in this modification, it is preferable that, when the downshift request is issued during the course of the execution of the torque reduction control, the downshift operation of the automatic transmission 200 is moderately executed, and, along with the downshift operation, the engine torque is moderately increased, i.e., a change rate (slope) of the torque increase along with the downshift operation is lowered, as compared to a change rate to be used when the downshift request is issued during non-execution of the torque reduction control. In this modification, as compared to a case where the downshift control is normally performed during the course of the torque reduction control (i.e., a case where the torque increase suitable for downshift is performed without taking into account the fact that the torque reduction control is being executed), it becomes possible to adequately ensure a torque reduction for controlling vehicle attitude to reliably ensure the improvement in the steering stability by the vehicle attitude control.

In another modification, instead of prohibiting the downshift control when the torque reduction control is executed, as in the above embodiments, a gear shift condition for executing the downshift control may be tightened when the torque reduction control is executed, as compared to when the torque reduction control is not executed. This modification will be specifically described with reference to FIG. 11.

Figure 11:
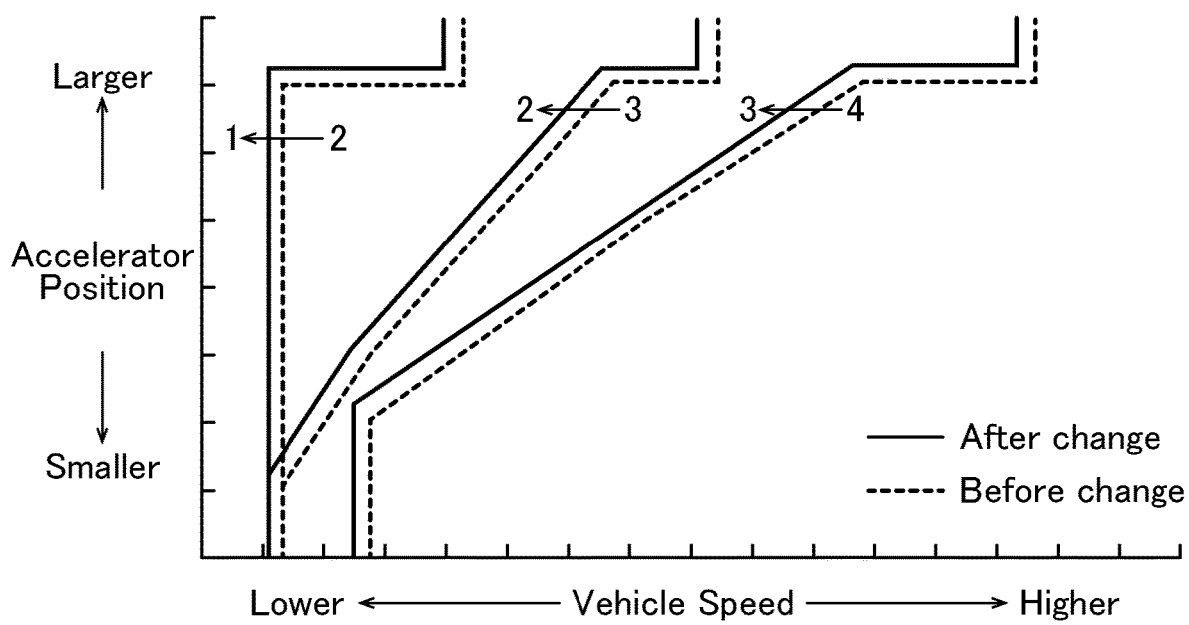
FIG. 11 is a gear shift map for deciding a speed stage of the automatic transmission, for use in a vehicle control device according to one modification of the above embodiments.

FIG. 11 is a gear shift map for deciding a speed stage of the automatic transmission, for use in a vehicle control device according to this modification. FIG. 11 presents a gear shift map for use during downshift, wherein the horizontal axis represents the vehicle speed, and the vertical axis represents the accelerator position. In FIG. 11, the broken lines indicate a normal gear shift map (which is a gear shift map before change, and is the same as that depicted in FIG. 4) to be used when the torque reduction control is not executed. Further, the solid lines indicate a gear shift map (which is a gear shift map after change) in this modification to be used when the torque reduction control is executed. In this modification, a gear shift map obtained by shifting the normal gear shift map toward a low vehicle speed side and a large accelerator position side, i.e., a gear shift map corrected such that the automatic transmission is less likely to be downshifted, is used during the torque reduction control. In this modification, the downshift control becomes less likely to be executed during the course of the torque reduction control, so that it becomes possible to ensure a torque reduction for controlling vehicle attitude, and ensure the improvement in steering stability by the vehicle attitude control.

In the above embodiments, the torque reduction control (vehicle attitude control) is executed based on the steering angle and the steering speed. In yet another modification, the torque reduction control may be executed based on the yaw rate or the lateral acceleration, instead of the steering angle and the steering speed. Each of the steering angle, the steering speed, the yaw rate and the lateral acceleration is equivalent to one example of "steering angle-related value" set forth in the appended claims.

LIST OF REFERENCE SIGNS

1 intake passage
5 throttle valve
10 engine
13 fuel injection valve
14 ignition plug
18 intake variable valve timing mechanism
25 exhaust passage
30 accelerator position sensor
39 vehicle speed sensor
40 steering angle sensor
50 PCM
51 downshift control part
53 vehicle attitude control part
55 downshift suppression part
57 vehicle attitude control suppression part
100 engine system
200 automatic transmission
210 TCM

The invention claimed is:

1. A vehicle control device, comprising:
an engine;
an engine torque regulating mechanism configured to regulate an output torque of the engine;
an automatic transmission provided on a driving force transmitting path between the engine and road wheels;
a downshift control part configured to execute a downshift control in which the automatic transmission is downshifted and the engine torque regulating mechanism is driven to increase the output torque of the engine, when a downshift request for downshifting the automatic transmission is issued; and
a vehicle attitude control part configured to execute a vehicle attitude control in which the engine torque regulating mechanism is driven to reduce the output torque of the engine to thereby generate deceleration of the vehicle, when such a condition that the vehicle is traveling and that a steering angle-related value pertaining to a steering angle of a steering device increases is satisfied,
wherein the vehicle control device further comprises a downshift suppression part configured to suppress executing the downshift control by the downshift control part when the vehicle attitude control is executed by the vehicle attitude control part.

2. The vehicle control device as recited in claim 1, wherein the downshift suppression part is configured to prohibit executing the downshift control, when the vehicle attitude control is executed by the vehicle attitude control part.

3. The vehicle control device according to claim 1, wherein, when the vehicle attitude control is executed by the vehicle attitude control part, the downshift suppression part is configured to permit the downshift of the automatic transmission by the downshift control part, while to suppress the drive of the engine torque regulating mechanism by the downshift control part for the purpose of increasing the output torque.

4. The vehicle control device according to claim 1,
wherein the downshift request is issued upon satisfaction of a given gear shifting condition for executing the downshift control, and
wherein the downshift suppression part is configured to tighten the gear shifting condition when the vehicle attitude control is executed by the vehicle attitude control part, as compared to when the vehicle attitude control is not executed by the vehicle attitude control part.

5. The vehicle control device according to claim 1, wherein the downshift suppression part is configured to suppress executing the downshift control by the downshift control part, when the engine torque regulating mechanism is driven by the vehicle attitude control part so as to reduce the output torque of the engine.

6. The vehicle control device according to claim 1,
wherein the vehicle further comprises a steering angle sensor configured to detect the steering angle of the steering device, and
wherein the vehicle attitude control part is configured to execute the vehicle attitude control, when such a condition that the vehicle is traveling and that a change rate of the steering angle detected by the steering angle sensor is equal to or greater than a given value is satisfied.

7. A vehicle control device, comprising:
an engine;
an engine torque regulating mechanism configured to regulate an output torque of the engine;
an automatic transmission provided on a driving force transmitting path between the engine and road wheels;
a downshift control part configured to execute a downshift control in which the automatic transmission is downshifted and the engine torque regulating mechanism is driven to increase the output torque of the engine, when a downshift request for downshifting the automatic transmission is issued; and
a vehicle attitude control part configured to execute a vehicle attitude control in which the engine torque regulating mechanism is driven to reduce the output torque of the engine to thereby generate deceleration of the vehicle, when such a condition that the vehicle is traveling and that a steering angle-related value pertaining to a steering angle of a steering device increases is satisfied,
wherein the vehicle control device further comprises a vehicle attitude control suppression part configured to suppress executing the vehicle attitude control by the vehicle attitude control part when the downshift control is executed by the downshift control part.

8. The vehicle control device according claim 7,
wherein the vehicle further comprises a steering angle sensor configured to detect the steering angle of the steering device, and
wherein the vehicle attitude control part is configured to execute the vehicle attitude control, when such a condition that the vehicle is traveling and that a change rate of the steering angle detected by the steering angle sensor is equal to or greater than a given value is satisfied.

9. A vehicle control device, comprising:
an engine;
an engine torque regulating mechanism configured to regulate an output torque of the engine;
an automatic transmission provided on a driving force transmitting path between the engine and road wheels;
a downshift control part configured to execute a downshift control in which the automatic transmission is downshifted and the engine torque regulating mechanism is driven to increase the output torque of the engine, when a downshift request for downshifting the automatic transmission is issued; and
a vehicle attitude control part configured to execute a vehicle attitude control in which the engine torque regulating mechanism is driven to reduce the output torque of the engine to thereby generate deceleration of the vehicle, when such a condition that the vehicle is traveling and that a steering angle-related value pertaining to a steering angle of a steering device increases is satisfied,
wherein the vehicle control device further comprises a period overlapping suppression part configured to suppress an overlap between an execution period during which the downshift control is executed by the downshift control part and an execution period during which the vehicle attitude control is executed by the vehicle attitude control part.

10. The vehicle control device according claim 9,
wherein the vehicle further comprises a steering angle sensor configured to detect the steering angle of the steering device, and
wherein the vehicle attitude control part is configured to execute the vehicle attitude control, when such a condition that the vehicle is traveling and that a change rate of the steering angle detected by the steering angle sensor is equal to or greater than a given value is satisfied.

* * * * *